United States Patent Office 3,269,177
Patented August 30, 1966

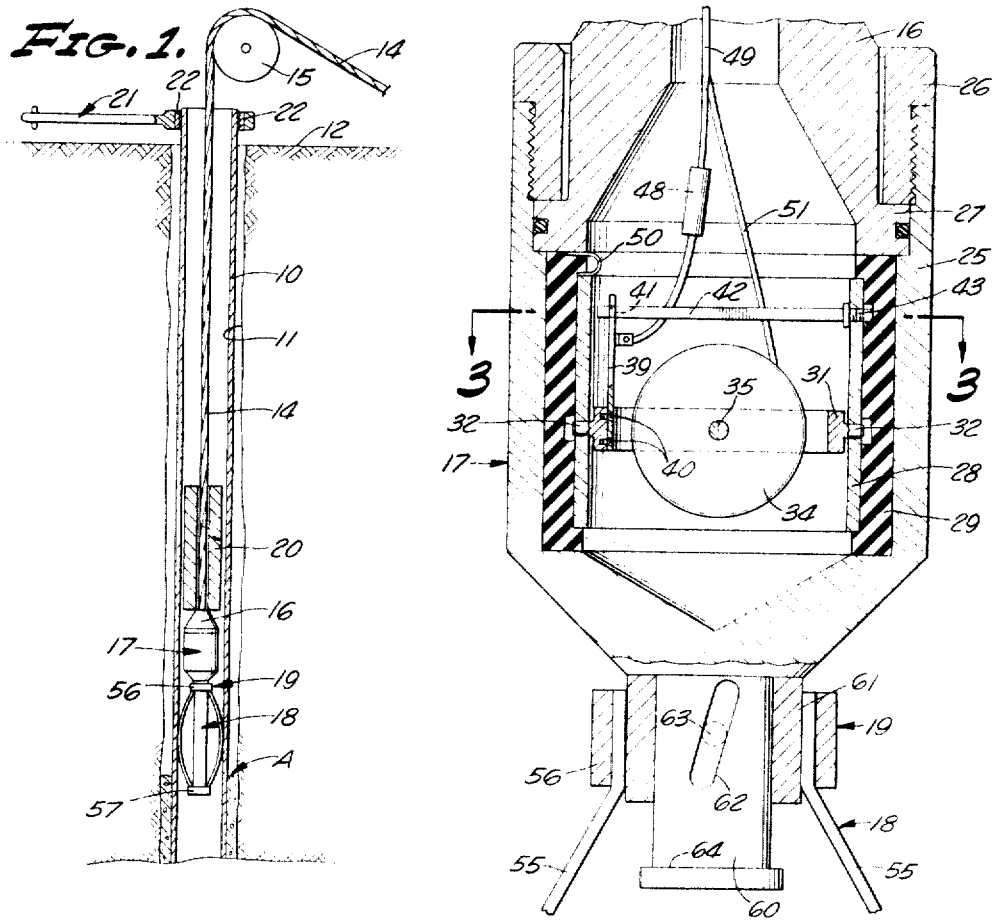
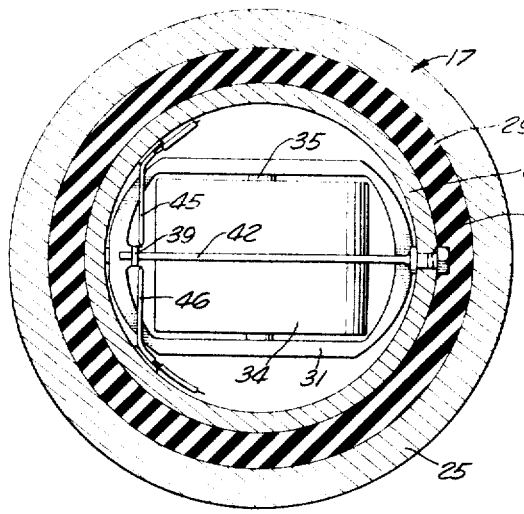
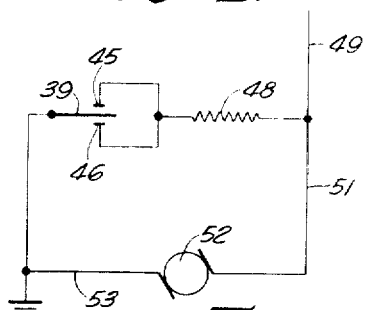
Aug. 30, 1966    M. B. CONRAD    3,269,177
STUCK-POINT INDICATOR FOR WELL PIPE
Filed Feb. 13, 1964
FIG. 1.
FIG. 2.
FIG. 3.
FIG. 4.
INVENTOR.
MARTIN B. CONRAD
BY Lyon & Lyon
ATTORNEYS

3,269,177
STUCK-POINT INDICATOR FOR WELL PIPE
Martin B. Conrad, P.O. Box 1026, North Downey Station, Downey, Calif.
Filed Feb. 13, 1964, Ser. No. 344,569
6 Claims. (Cl. 73—151)

This invention relates to a method of determining the stuck-point of a pipe in a well and also to novel apparatus for carrying out the method. Both method and apparatus involve the use of the precession movement of a gyroscope to measure the extent of turning movement of the pipe under a torque load applied at the surface.

When pipe becomes stuck in a well, it may be desirable to salvage as much of the pipe as possible by cutting it off above the stuck point and removing it from the well. It is important to be able to determine with accuracy the location of the stuck point, so that a maximum amount of pipe can be salvaged.

Briefly stated, the method and apparatus of the present invention locate the stuck point by lowering a device on a cable through the interior of the pipe. The device includes a small gyroscope spinning on a generally horizontal axis and powered by an electric motor. While the device is held in a fixed elevation in the well and in contact with the pipe by means of bow springs or a magnet, the upper end of the pipe is turned through an angle. The gyroscope device is turned through a smaller angle by the bow springs or magnet, and this causes precession movement of the gyroscope. The extent of precession movement or tilting is measured and signaled through the cable to the surface. The device is then lowered to another elevation within the pipe, and the pipe is again turned through an angle at the surface. A signal is received, indicating the corresponding angular movement of the pipe at the second position of the device. Two such measurements are enough to be able to plot a curve to show the depth at which the pipe is stuck. A third measurement can be used as a check on the other two.

Another feature of the apparatus of this invention resides in the provision of a spiral connection between the gyroscope housing and the bow spring assembly to permit the checking of the performance of the instrument in situ before turning the pipe at the surface.

Other and related objects and advantages will appear hereinafter.

In the drawings:

FIGURE 1 is a sectional side elevation in diagrammatic form, illustrating the method and apparatus of this invention.

FIGURE 2 is a sectional elevation on an enlarged scale, showing details of construction of the device which is lowered into the well pipe.

FIGURE 3 is a transverse sectional view taken substantially on the lines 3—3 as shown in FIGURE 2.

FIGURE 4 is a wiring diagram.

Referring to the drawings, a well pipe 10 extends into the well bore 11 and has an upper portion projecting above the ground surface 12. The pipe 10 is stuck below elevation A and free above that elevation. The point A is referred to as the stuck point. The pipe 10 may be tubing, drill pipe, or casing, and is ordinarily constituted of sections connected end-to-end by threads.

A flexible cable 14, having at least one electrical lead wire is connected to a power winch, not shown, at the surface and passes over a pulley 15. The electrical lead is connected at the surface to suitable signal-receiving apparatus, not shown. The lower end of the cable 14 is attached by a conventional device 16 to the upper end of a measuring device 17. A bow-spring assembly, generally designated 18, frictionally engages the inner surface of the pipe 10 and is attached to the device 17 by means of the coupling 19. A sinker bar 20 comprising a tubular weight encircles a portion of the cable 14 and rests on the connector 16. A permanent magnet or electromagnet may replace the bow-spring assembly, if desired.

Means are provided at the surface for applying a torque load to the pipe or for changing the intensity of the torque load on the pipe, and, as shown in FIGURE 1 of the drawings, this means includes a conventional pipe tong 21 having jaws 22 releasably engageable with the pipe 10.

As shown in FIGURES 2 and 3, the measuring device 17 includes a housing 25 having a clamp ring 26 for securing it to the flange 27 of the connector 16. A gyroscope shell 28 is shock-mounted within the housing by means of an enclosing sleeve 29 of elastomeric material, such as rubber. A tilt frame 31 is provided with oppositely directed horizontal trunnions 32 turnably mounted on a shell 28. A gyroscope wheel 34 driven by an internal electric motor, not shown, is mounted to spin on a shaft 35 mounted on the tilt frame 31. The axis of the shaft 35 intersects the common axis of the trunnions 32 at right angles.

When the housing 25 is turned through on angle about its longitudinal axis, this turning movement is communicated to the tilt frame 31 through the rubber sleeve 29 and gyroscope shell 28. The effect of such angular turning movement of the tilt frame 31 about the longitudinal axis of the housing 25 is to cause precession movement of the gyroscope, which tilts the frame 31 about the axis of the trunnions 32. The extent of this tilting movement of the frame about the axis of the trunnions 22 is directly related to the extent of turning movement of the housing 25 about its longitudinal axis. The extent of tilting movement of the frame 31 may be measured in any convenient manner. As shown in the drawings, an upright finger 39 is fixed to the frame 31 by suitable fastenings 40, and this finger 39 has an aperture 41 near its upper end through which the projecting end of a leaf spring 42 extends. This leaf spring 42 is fixed at the other end 43 to the gyroscope shell 28. The construction is such that tilting movement of the frame 31 in either direction is resisted by the leaf spring 42. Thus there is provided one form of "rate-gyro" for sensing the amount of turning of the pipe.

In the particular form of the invention shown in the drawings, a pair of metallic contact arms 45 and 46 are supported on the gyroscope shell 28 but insulated therefrom. When the upright metallic finger 39 is in central position, it does not contact either of these arms 45 or 46, but when the frame 31 tilts, the finger 39 swings into contact with one of the arms, thereby completing an electrical circuit. This electrical circuit includes a resistor 48 and passes from the hot wire 49 through a finger 39, trunnions 32, to the shell 28, and then through the jumper wire 50 to the connector 16. The strands of the cable 14 are connected to this member 16 by conventional means, not shown. Another wire 51 connects the hot wire 49 to the motor 52 (FIGURE 4), which drives the gyroscope wheel 34. The motor 52 is grounded to the shell 28 by line 53.

In operation, the device 17 including the bow-spring assembly 18 and the sinker bar 20 are lowered into the well pipe to a first position which is believed to be above the stuck point A. Electrical energy is supplied through the hot wire 49 within the monocable 14. This causes the motor-driven gyroscope wheel 34 to spin, and may also energize an electromagnet if one is used in place of the bow-spring assembly 18. The upper end of the pipe 10 is then turned suddenly by means of the pipe tong 21. The pipe 10 turns through the greatest angle at the ground surface, and does not turn at all at the stuck point A and therebelow. Between the ground surface and stuck point A, the turning movement of the pipe is inversely proportional to the distance below the surface. The bow-spring assembly 18 has individual bow springs 55 extending between axially spaced collars 56 and 57, and these bow springs 55 slidably contact the pipe 10 on the interior surface thereof. When the pipe 10 turns, the bow springs turn with it and the bow-spring assembly 18 turns the housing 25 through the coupling 19 through the same angular travel.

This turning of the housing 25 about its longitudinal axis causes the frame 31 to tilt by precession action of the gyroscope as described above. The upright metallic finger 39 swings to one side, thereby engaging one of the contact parts 45 or 46 to close an electric circuit. This closing of the electric circuit to ground through the resistor 48 is detected at the surface by suitable instruments, and the time delay between closing of the circuit and reopening thereof constitutes a measure of the angular tilting of the frame 31. The spring 42 acts to return the upright finger 39 to its central "off" position to interrupt the electrical circuit. The device is previously calibrated at the surface so that the angle of turning movement of the housing 25 about its longitudinal axis is known for any time interval that the electrical circuit through the resistor 48 remains closed.

The torque load on the upper end of the pipe 10 is then relaxed, and the device 17 is lowered to a second location within the pipe 10. The torque load is again suddenly applied by means of the pipe tong 21 to cause the gyroscope to close the electrical circuit through the resistor 48. The time duration between opening and closing of the circuit is again noted, thereby furnishing an indication of the angular travel of the housing 25 about its longitudinal axis. From these two readings and from the knowledge of the elevations at which they were taken, the location of the stuck point A can readily be calculated. A third reading at another elevation may be taken as a check on the first two.

The coupling 19 includes a cylindrical shouldered stem 60, fixed on the lower end of the housing 25 and slidably receiving a ring 61 which is fixed relative to the collar 56 and the upper ends of the bow springs 55. A spiral keyway 62 formed in the outer surface of the stem 60 receives a radial pin or key 63, fixed on the ring 61. The ring 61 and stem 60 are in this way connected for relative spiral sliding movement along the longitudinal axis of the housing 25. If a magnet is used instead of the bow-spring assembly 18, such magnet is connected to the ring 61.

This spiral connection affords a means for checking the operation of the gyroscope device prior to applying torque to the pipe 10 at the upper end thereof. After the device 17 has been lowered to the first position within the pipe 10, the cable 14 is lifted for a short distance, thereby causing the shoulder 64 on the stem 60 to contact the lower surface of the ring 61. The resulting turning movement of the housing 25 about its longitudinal axis causes the gyroscope frame 31 to tilt by precession action, thereby closing an electric circuit through the resistor 48, and this action is readily detected at the surface. The operator is thus apprised that the gyroscope device is working properly.

After allowing sufficient time for the gyroscope frame 31 to return to its initial position, as indicated by reopening of the electrical circuit through the resistor 48, the upper end of the pipe 10 may be turned by the pipe tongs 21 as described above.

It will be understood that the device operates satisfactorily, regardless in which direction the pipe is turned. Also, torque may initially be applied to the upper end of the pipe and then suddenly released; the only requirement is that the upper end of the pipe be turned, whether by applying a torque load or releasing it. The angle through which the upper end of the pipe turns should be the same in each instance, and the speed of turning should be the same.

Having fully described my invention, it is to be understood that I am not to be limited to the details herein set forth, but that my invention is of the full scope of the appended claims.

I claim:

1. Apparatus for determining the stuck-point of a pipe in a well, comprising in combination: a gyroscope device having a pipe-contacting element thereon, means for lowering the device into the pipe, the device including a gyroscope wheel mounted to rotate about an axis noncoincident with the longitudinal axis of the pipe, means for suddenly turning the upper end of the pipe to cause said element to turn the device about the pipe axis, signal means operated by precession movement of the gyroscope wheel resulting from such turning of the device, said signal means acting to transmit a signal to the surface in accordance with the extent of such precession movement.

2. Apparatus for determining the stuck-point of a pipe in a well, comprising in combination: a gyroscope device having a pipe-contacting element thereon, means for lowering the device into the pipe, the device including a gyroscope frame and a gyroscope wheel mounted to rotate on the frame about an axis noncoincident with the longitudinal axis of the pipe, means for suddenly turning the upper end of the pipe to cause said element to turn the device about the pipe axis, signal means operated by precession movement of the gyroscope frame resulting from such turning of the device, said signal means acting to transmit a signal to the surface indicating the existence of such precession movement.

3. Apparatus for determining the stuck-point of a pipe in a well, comprising in combination: a gyroscope device having a pipe-contacting element thereon, means for lowering the device into the pipe, the device including a gyroscope frame and a gyroscope wheel mounted to rotate on the frame about an axis noncoincident with the longitudinal axis of the pipe, means for suddenly turning the upper end of the pipe to cause said element to turn the device about the pipe axis, signal means operated by precession movement of the gyroscope frame resulting from such turning of the device, said signal means acting to transmit a signal to the surface in accordance with the extent of such precession movement.

4. Apparatus for determining the stuck-point of a pipe in a well, comprising in combination: a gyroscope device having a pipe-contacting element thereon, means including a cable for lowering the device into the pipe, the device including a gyroscope frame and a gyroscope wheel mounted to rotate on the frame about an axis noncoincident with the longitudinal axis of the pipe, means for applying torque suddenly to turn the upper end of the pipe to cause said element to turn the device about the pipe axis, signal means operated by precession movement of the gyroscope frame resulting from such turning of the device, said signal means acting to transmit a signal to the surface via said cable in accordance with the extent of such precession movement.

5. Apparatus for determining the stuck-point of a pipe in a well, comprising in combination: a gyroscope device having pipe-contacting friction elements thereon, means including a cable for lowering the device into the pipe, the device including a housing, a gyroscope frame tiltably mounted on the housing, a gyroscope wheel mounted to rotate on the frame about an axis noncoincident with the longitudinal axis of the pipe, means for suddenly turning the upper end of the pipe to cause the friction elements to turn the device about the pipe axis, and thereby cause precession movement of the gyroscope frame, and signal means acting to transmit a signal to the surface via said cable in accordance with the extent of such precession movement.

6. Apparatus for determining the stuck-point of a pipe in a well, comprising in combination: a gyroscope device, a friction device having pipe-contacting friction elements thereon, a coupling connecting said devices for limited relative spiral movement, means for lowering the devices into the pipe, the gyroscope device including a gyroscope frame and a gyroscope wheel mounted to rotate on the frame about an axis noncoincident with the longitudinal axis of the pipe, the lowering means being operable to lift the gyroscope device relative to the friction device to cause the coupling to turn the gyroscope device about the pipe axis, signal means operated by precession movement of the gyroscope frame resulting from such turning, said signal means acting to transmit a signal to the surface in accordance with the extent of such precession movement.

References Cited by the Examiner

UNITED STATES PATENTS

| | | | |
|---|---|---|---|
| 1,928,971 | 10/1933 | Dillon et al. | 33—205 |
| 2,716,890 | 9/1955 | Martin | 73—151 |
| 2,875,347 | 2/1959 | Anderson et al. | |
| 3,006,186 | 10/1961 | Berry | 73—151 |
| 3,142,181 | 7/1964 | Moller | 74—5 |

RICHARD C. QUEISSER, *Primary Examiner.*

J. W. MYRACLE, *Assistant Examiner.*